(No Model.)

T. E. FOGALSANG.
GALVANIC BATTERY.

No. 561,878. Patented June 9, 1896.

Witnesses
Herbert Bradley
Jas. M. White

Inventor
Thomas E. Fogalsang
by Knight Bros
Attys.

UNITED STATES PATENT OFFICE.

THOMAS E. FOGALSANG, OF SACRAMENTO, CALIFORNIA.

GALVANIC BATTERY.

SPECIFICATION forming part of Letters Patent No. 561,878, dated June 9, 1896.

Application filed July 29, 1895. Serial No. 557,479. (No model.)

*To all whom it may concern:*

Be it known that I, THOMAS E. FOGALSANG, a citizen of the United States, and a resident of Sacramento, in the county of Sacramento and State of California, have invented certain new and useful Improvements in Galvanic Batteries, of which the following is a specification.

My invention relates to the manner of arranging the zinc in the outer cell of those batteries employing the porous cup, and also to the construction of the cups for forming the cells and to the electrolyte and to certain elements which are introduced into the battery for the purposes of preserving the zinc and generating heat by chemical action extraneous to the zinc to stimulate the action of the battery.

My invention will be fully understood upon reference to the accompanying drawings, in which—

Figure 1:
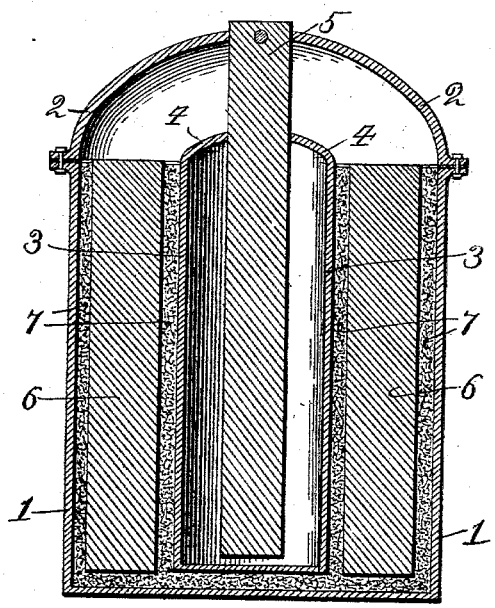
Figure 2:
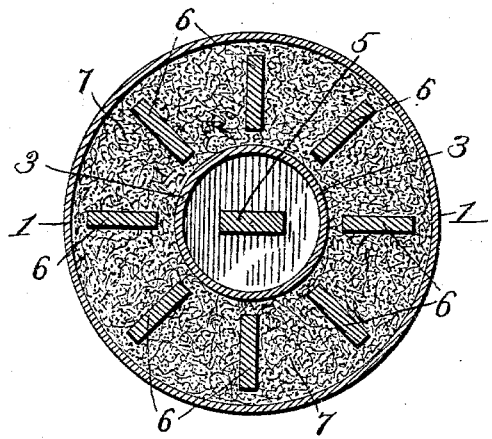

Figure 1 is a vertical axial section through the improved battery, and Fig. 2 is a horizontal section through the same.

My invention preferably employs an outer receptacle 1, of material commonly used for such purposes and upon which is fitted a dome or cover 2, and inner porous cell 3, likewise provided with a dome or cap 4, a carbon element 5 within the porous cell, a number of rectangular strips of zinc 6 symmetrically distributed in radial position around the cell 4 in the outer receptacle 1, and suitable fluid electrolyte, fluid zinc-preserving substance, and packing of heat-producing vegetable matter, which are as follows:

In the inner or carbon cell or porous cup is placed a fluid consisting of nitric acid, sulfuric acid, and a solution of eucalyptus. The eucalyptus is obtained by boiling the bark and leaves or either of them in water, and seven parts of the fluid thus obtained are placed with two parts of sulfuric acid and one part of nitric acid. The object of employing the solution of eucalyptus in the inner cup is to modify the action of the acids, there being an inherent power in the solution which checks the action of the acids to preserve their strength. Thus it will be seen that a given quantity of the acids will accomplish better results with the aid of the solution than without it, and the solution being cheap as compared with the acids a great saving will thus be effected.

In the outer cell or receptacle 1, and surrounding the porous cup, the zinc strips after being arranged as before described are closely packed with a suitable heat-producing vegetable matter, such as wheat, or any other vegetable or other matter which, when attacked by acids, will decompose and produce heat within the cell. This outer cell thus packed is sprinkled from time to time with the eucalyptus solution hereinbefore referred to.

By placing the strips of zinc in the manner shown and described the galvanic action which takes place between them and the carbon is distributed over practically the entire area, which would not be the case if a flat surface were presented toward the carbon. By the introduction of the solution of eucalyptus in the outer cell the same object is obtained as in the inner cell, the chemical action of the acids upon the zinc being modified, the eucalyptus preventing the accumulation of salts on the zinc, consequently greatly increasing the life of the plates and battery. Moreover, the heat producing and deterring elements which are introduced in the battery are very cheap in the raw state and inexpensive in preparation.

Having thus described my invention, the following is what I claim as new therein and desire to secure by Letters Patent:

1. In an electric battery, an acid electrolyte mixed with a solution of eucalyptus for the purpose explained.

2. In an electric battery, an electrolyte consisting of two parts of sulfuric acid, one part of nitric acid and seven parts of a solution obtained by boiling the parts of the eucalyptus-tree in water, substantially as and for the purpose set forth.

3. In combination with an electric battery, having a zinc element, a packing of wheat surrounding said zinc element as explained.

4. In an electric battery, an acid mollifying solution of eucalyptus for preserving the zinc and a packing of heat-producing vegetable matter for supplying the heat lost by the retardation of reaction produced by the mollifying solution, substantially as explained.

THOMAS E. FOGALSANG.

Witnesses:
J. S. SPILMAN,
V. L. HATFIELD.